(12) United States Patent
Li

(10) Patent No.: US 12,228,903 B2
(45) Date of Patent: Feb. 18, 2025

(54) VALUE-ADDED SERVICE IMPLEMENTATION METHOD AND APPARATUS, AND CLOUD SERVER

(71) Applicant: Huawei Technologies Co., Ltd., Shenzhen (CN)

(72) Inventor: Nian Li, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 718 days.

(21) Appl. No.: 16/479,766

(22) PCT Filed: Mar. 31, 2017

(86) PCT No.: PCT/CN2017/078967
§ 371 (c)(1),
(2) Date: Jul. 22, 2019

(87) PCT Pub. No.: WO2018/133205
PCT Pub. Date: Jul. 26, 2018

(65) Prior Publication Data
US 2020/0218217 A1   Jul. 9, 2020

(30) Foreign Application Priority Data
Jan. 20, 2017   (CN) .......................... 201710048019.7

(51) Int. Cl.
*G05B 19/048*    (2006.01)
*G06F 11/30*     (2006.01)
(Continued)

(52) U.S. Cl.
CPC ........ *G05B 19/048* (2013.01); *G06F 11/3055* (2013.01); *G06F 11/3058* (2013.01);
(Continued)

(58) Field of Classification Search
CPC .......... G05B 19/048; G05B 2219/2642; G05B 23/0272; G06F 11/3055; G06F 11/3058;
(Continued)

(56) References Cited

U.S. PATENT DOCUMENTS 4,918,627 A * 4/1990 Garcia .................... G06T 7/001
                                                                 700/184
9,696,055 B1 * 7/2017 Goodman ................ F24F 11/30
(Continued)

FOREIGN PATENT DOCUMENTS

CN    102065130 A    5/2011
CN    102122261 A    7/2011
(Continued)

OTHER PUBLICATIONS

Machine Translation and Abstract of Chinese Publication No. CN103138962, Jun. 5, 2013, 28 pages.
(Continued)

*Primary Examiner* — Farley Abad
(74) *Attorney, Agent, or Firm* — Conley Rose, P.C.

(57) ABSTRACT

A system comprises a plurality of electronic devices and a server. Each of the plurality of electronic devices is configured to report a working status parameter to the server. The server is configured to receive working slams parameters from the plurality of electronic devices, determine a first electronic device being faulty from the plurality of electronic devices based on working status parameters sent by the plurality of electronic devices, and send an indication to a control device corresponding to the first electronic device. The server is further configured to receive a response from the control device indicating a request for maintenance of the first electronic device in response to a user's selection on the control device.

20 Claims, 9 Drawing Sheets

(51) Int. Cl.
*G06F 11/34* (2006.01)
*G06Q 10/20* (2023.01)
*H04L 67/025* (2022.01)

(52) U.S. Cl.
CPC ......... *G06F 11/3452* (2013.01); *G06Q 10/20* (2013.01); *H04L 67/025* (2013.01); *G05B 2219/2642* (2013.01)

(58) Field of Classification Search
CPC ............ G06F 11/3452; G06F 2201/81; G06F 11/0772; G06F 11/3006; G06F 11/0709; G06Q 10/20; H04L 67/025
USPC .......................................................... 700/79
See application file for complete search history.

(56) References Cited

U.S. PATENT DOCUMENTS

| | | | | |
|---|---|---|---|---|
| 10,274,382 | B1* | 4/2019 | Trundle | G01W 1/10 |
| 10,579,971 | B1* | 3/2020 | Davis | G06Q 10/1097 |
| 2002/0095269 | A1 | 7/2002 | Natalini et al. | |
| 2007/0198679 | A1* | 8/2007 | Duyanovich | G06F 11/3409 |
| | | | | 709/223 |
| 2010/0185416 | A1* | 7/2010 | Furem | E02F 9/267 |
| | | | | 702/182 |
| 2011/0172961 | A1 | 7/2011 | Sunata | |
| 2013/0158714 | A1* | 6/2013 | Barton | F24F 11/89 |
| | | | | 700/276 |
| 2014/0316585 | A1* | 10/2014 | Boesveld | G05D 23/1905 |
| | | | | 700/278 |
| 2016/0080219 | A1 | 3/2016 | Ishizaka | |
| 2016/0205189 | A1* | 7/2016 | Mopur | G06F 11/3034 |
| | | | | 709/213 |
| 2016/0209818 | A1* | 7/2016 | Mandle | H04L 41/12 |
| 2016/0224947 | A1* | 8/2016 | Ishimaru | G06F 21/608 |
| 2017/0206953 | A1* | 7/2017 | Tai | G11C 11/5642 |
| 2017/0277582 | A1* | 9/2017 | Chen | H04L 43/045 |
| 2018/0034926 | A1* | 2/2018 | Delinselle | H04L 43/16 |

FOREIGN PATENT DOCUMENTS

| | | |
|---|---|---|
| CN | 103138962 A | 6/2013 |
| CN | 103138980 A | 6/2013 |
| CN | 103276557 A | 9/2013 |
| CN | 103616863 A | 3/2014 |
| CN | 103618945 A | 3/2014 |
| CN | 104049606 A | 9/2014 |
| CN | 104317255 A | 1/2015 |
| CN | 104320480 A | 1/2015 |
| CN | 204347592 U | 5/2015 |
| CN | 105323111 A | 2/2016 |
| CN | 106019959 A | 10/2016 |
| JP | 2015099471 A | 5/2015 |

OTHER PUBLICATIONS

Machine Translation and Abstract of Chinese Publication No. CN103618945, Mar. 5, 2014, 20 pages.
Machine Translation and Abstract of Chinese Publication No. CN104320480, Jan. 28, 2015, 17 pages.
Machine Translation and Abstract of Chinese Publication No. CN106019959, Oct. 12, 2016, 29 pages.
Foreign Communication From a Counterpart Application, PCT Application No. PCT/CN2017/078967, English Translation of International Search Report dated Sep. 28, 2017, 2 pages.
Foreign Communication From a Counterpart Application, PCT Application No. PCT/CN2017/078967, English Translation of Written Opinion dated Sep. 28, 2017, 4 pages.
Machine Translation and Abstract of Chinese Publication No. CN103138980, Jun. 5, 2013, 9 pages.
Machine Translation and Abstract of Chinese Publication No. CN102065130, May 18, 2011, 15 pages.
Machine Translation and Abstract of Chinese Publication No. CN103616863, Mar. 5, 2014, 8 pages.
Foreign Communication From a Counterpart Application, Chinese Application No. 201780003472.4, Chinese Office Action Oct. 30, 2019, 9 pages.
Foreign Communication From a Counterpart Application, European Application No. 17892988.1, Extended European Search Report dated Nov. 26, 2019, 10 pages.

* cited by examiner

VALUE-ADDED SERVICE IMPLEMENTATION METHOD AND APPARATUS, AND CLOUD SERVER

CROSS-REFERENCE TO RELATED APPLICATIONS

This application is a national stage application of International Patent Application No. PCT/CN2017/078967 filed on Mar. 31, 2017, which claims priority to Chinese Patent application Ser. No. 20/171,0048019.7, filed on Jan. 20, 2017. Both of the aforementioned applications are hereby incorporated by reference in their entireties.

TECHNICAL FIELD

The present invention relates to the field of communications technologies, and in particular, to a value-added service implementation method and apparatus, and a cloud server.

BACKGROUND

Currently, as user equipment launched in recent years, smart household appliances (for example, a smart television, a smart air conditioner, and a smart refrigerator) gradually enter users' homes, and provide convenient and quick living experience for users. The smart household appliances have various intelligent functions such as networking, remote control, detection, and information reporting.

When a user uses a smart household appliance, the smart household appliance may be faulty because of an improper operation of the user or a software or hardware defect of the smart household appliance. When the smart household appliance is faulty (for example, an air conditioner and a refrigerator cannot keep cooling, or a washing machine does not work), the user may contact a manufacturer or a professional maintenance organization, and wait for a maintenance person to carry out maintenance, or the user may deliver the smart household appliance to a maintenance organization for maintenance.

Therefore, during common use of a smart household appliance by a user, there are the following disadvantages: 1) In absence of expertise, the user cannot determine dysfunction of the smart household appliance until the smart household appliance is completely unable to work. Although a low-cost circuit system such as a networked or automatically controlled circuit system is added to most smart household appliances, the added circuit system does not have a fault and performance detection capability. Consequently, a convenient service cannot be more effectively provided for the user, and life quality of the user is affected. 2) A maintenance process of the smart household appliance is cumbersome, and consumes a large amount of time. Therefore, time of the user is wasted.

SUMMARY

Embodiments of the present invention provide a value-added service implementation method and apparatus, and a cloud server, so as to predict a fault of a smart household appliance, provide fault information of a currently used smart household appliance for a user, and if necessary, provide services such as maintenance and repair of the smart household appliance for the user, thereby improving user experience.

According to a first aspect, an embodiment of the present invention provides a value-added service implementation method, where the method includes:
    obtaining, by a cloud server, a device attribute parameter of at least one user equipment, where the device attribute parameter includes a device working status parameter;
    determining, by the cloud server, faulty user equipment from the at least one user equipment based on the device working status parameter;
    sending, by the cloud server, a notification message to a control device corresponding to the faulty user equipment, where the notification message includes fault information of the faulty user equipment, so that the control device displays the fault information, and receives a selection operation that is performed by a user based on the fault information;
    receiving, by the cloud server, a first feedback message that is sent by the control device based on the selection operation; and
    sending, by the cloud server, the fault information and attribute information of the user to a maintenance server based on the first feedback message.

With reference to the first aspect, in a first implementation of the first aspect, the method further includes:
    receiving, by the cloud server, a second feedback message that is sent by the control device based on the selection operation;
    determining, by the cloud server, whether the faulty user equipment is still in a faulty state; and
    stopping sending, by the cloud server, the fault information to the control device if the faulty user equipment is still in the faulty state.

With reference to the first aspect, in a second implementation of the first aspect, the method further includes:
    receiving, by the cloud server, a third feedback message that is sent by the control device based on the selection operation; and
    sending, by the cloud server, the fault information to the control device again.

With reference to the first aspect, in a third implementation of the first aspect, the determining, by the cloud server, faulty user equipment from the at least one user equipment based on the device working status parameter specifically includes:
    performing, by the cloud server, average-based statistical processing on the device working status parameter to obtain a user equipment reference average value;
    obtaining, by the cloud server, a working status distribution curve diagram of the user equipment based on the device working status parameter;
    determining, by the cloud server, a device critical interval and at east one device interval based on the working status distribution curve diagram; and
    when the device critical interval is on a left side of the user equipment reference average value, determining, by the cloud server, the adjacent device interval on a left side of the device critical interval as a faulty device interval, and determining the adjacent device interval on a right side of the device critical interval as a normal device interval; or when the device critical interval is on a right side of the user equipment reference average value, determining, by the cloud server, the adjacent device interval on a left side of the device critical interval as a normal device interval, and determining the adjacent device interval on a right side of the device critical interval as a faulty device interval.

With reference to the first aspect, in a fourth implementation of the first aspect, the fault information includes fault cause information and fault type information of the faulty user equipment; and before the sending, by the cloud server, a notification message to a control device corresponding to the faulty user equipment, the method further includes:

determining, by the cloud server, whether the device working status parameter meets a preset fault condition; and determining, by the cloud server, a fault cause and a fault type of the faulty user equipment based on the fault condition if the device working status parameter meets the fault condition.

With reference to the first aspect, in a fifth implementation of the first aspect, the determining, by the cloud server, a faulty control device from the at least one control device based on the device working status parameter specifically includes:

receiving, by the cloud server, a setting instruction, where the setting instruction includes a first screening threshold;

determining, by the cloud server, whether the device working status parameter meets the first screening threshold; and if the device working status parameter meets the second screening threshold, determining, by the cloud server, that the user equipment is normal user equipment; or if the device working status parameter does not meet the second screening threshold, determining, by the cloud server, that the user equipment is faulty user equipment.

According to a second aspect, an embodiment of the present invention provides a value-added service implementation method, where the method includes:

receiving, by a control device, a notification message sent by a cloud server, where the notification message includes fault information of faulty user equipment determined by the cloud server from at least one user equipment;

displaying, by the control device, the fault information;

receiving, by the control device, a selection operation that is entered by a user based on the fault information; and sending, by the control device, a first feedback message to the cloud server based on the selection operation, where the first feedback message is used to enable the cloud server to send the fault information and attribute information of the user to a maintenance server.

With reference to the second aspect, in a first implementation of the second aspect, the method further includes:

sending, by the control device, a second feedback message to the cloud server based on the selection operation, where the second feedback message is used to enable the cloud server to determine whether the faulty user equipment is still in a faulty state, and if the faulty user equipment is still in the faulty state, the cloud server stops sending the fault information to the control device.

With reference to the second aspect, in a first implementation of the second aspect, the method further includes:

sending, by the control device, a third feedback message to the cloud server based on the selection operation, where the third feedback message is used to enable the cloud server to send the fault information to the control device again.

According to a third aspect, an embodiment of the present invention provides a value-added service implementation apparatus, where the apparatus includes:

an obtaining unit, configured to obtain a device attribute parameter of at least one user equipment, where the device attribute parameter includes a device working status parameter;

a first determining unit, configured to determine faulty user equipment from the at least one user equipment based on the device working status parameter;

a sending unit, configured to send a notification message to a control device corresponding to the faulty user equipment, where the notification message includes fault information of the faulty user equipment, so that the control device displays the fault information, and receives a selection operation that is performed by a user based on the fault information; and a receiving unit, configured to receive a first feedback message that is sent by the control device based on the selection operation, where the sending unit is further configured to send the fault information and attribute information of the user to a maintenance server based on the first feedback message.

With reference to the third aspect, in a first implementation of the third aspect, the receiving unit is further configured to receive a second feedback message that is sent by the faulty user equipment based on the selection operation;

the apparatus further includes a first judgment unit, configured to determine whether the control device is still in a faulty state; and the sending unit is further configured to stop sending the fault information to the control device if the faulty user equipment is still in the faulty state.

With reference to the third aspect, in a second implementation of the third aspect, the receiving unit is further configured to receive a third feedback message that is sent by the control device based on the selection operation; and the sending unit is further configured to send the fault information to the control device again.

With reference to the third aspect, in a third implementation of the third aspect, the first determining unit is specifically configured to: perform average-based statistical processing on the device working status parameter to obtain a user equipment reference average value;

obtain a working status distribution curve diagram of the user equipment based on the device working status parameter;

determine a device critical interval and at least one device interval based on the working status distribution curve diagram; and when the device critical interval is on a left side of the user equipment reference average value, determine the adjacent device interval on a left side of the device critical interval as a faulty device interval, and determine the adjacent device interval on a right side of the device critical interval as a normal device interval; or when the device critical interval is on a right side of the user equipment reference average value, determine the adjacent device interval on a left side of the device critical interval as a normal device interval, and determine the adjacent device interval on a right side of the device critical interval as a faulty device interval.

With reference to the third aspect, in a fourth implementation of the third aspect, the fault information included in the notification message sent by the sending unit includes fault cause information and fault type information of the faulty user equipment; and the apparatus further includes: a second judgment unit, configured to determine whether the device working status parameter meets a preset fault condition; and a second determining unit, configured to determine a fault cause and a fault type of the faulty user equipment based on the fault condition if the device working status parameter meets the fault condition.

With reference to the third aspect, in a fifth implementation of the third aspect, the first determining unit is specifically configured to: receive a setting instruction, where the setting instruction includes a first screening threshold;

determine whether the device working status parameter meets the first screening threshold; and if the device working status parameter meets the first screening threshold, determine that the user equipment is normal user equipment; or if the device working status parameter does not meet the first screening threshold, determine that the user equipment is faulty user equipment.

According to a fourth aspect, an embodiment of the present invention provides a value-added service implementation apparatus, where the apparatus includes:

a receiving unit, configured to receive a notification message sent by a cloud server, where the notification message includes fault information of faulty user equipment determined by the cloud server from at least one user equipment;

a display unit, configured to display the fault information, where the receiving unit is further configured to receive a selection operation that is entered by a user based on the fault information; and a sending unit, configured to send a first feedback message to the cloud server based on the selection operation, where the first feedback message is used to enable the cloud server to send the fault information and attribute information of the user to a maintenance server.

With reference to the fourth aspect, in a first implementation of the fourth aspect, the sending unit is further configured to send a second feedback message to the cloud server based on the selection operation, where the second feedback message is used to enable the cloud server to determine whether the faulty user equipment is still in a faulty state, and if the faulty user equipment is still in the faulty state, the cloud server stops sending the fault information to the control device.

With reference to the fourth aspect, in a second implementation of the fourth aspect, the sending unit is further configured to send a third feedback message to the cloud server based on the selection operation, where the third feedback message is used to enable the cloud server to send the fault information to the control device again.

According to a fifth aspect, an embodiment of the present invention provides a cloud server, and the cloud server includes:

a processor, configured to obtain a device attribute parameter of at least one user equipment, where the device attribute parameter includes a device working status parameter, where the processor is further configured to determine faulty user equipment from the at least one user equipment based on the device working status parameter;

a transmitter, configured to send a notification message to a control device corresponding to the faulty user equipment, where the notification message includes fault information of the faulty user equipment, so that the control device displays the fault information, and receives a selection operation that is performed by a user based on the fault information; and a receiver, configured to receive a first feedback message that is sent by the control device based on the selection operation, where the transmitter is further configured to send the fault information and attribute information of the user to a maintenance server based on the first feedback message.

With reference to the fifth aspect, in a first implementation of the fifth aspect, the receiver is further configured to receive a second feedback message that is sent by the control device based on the selection operation;

the processor is further configured to determine whether the faulty user equipment is still in a faulty state; and the transmitter is further configured to stop sending the fault information to the control device if the faulty user equipment is still in the faulty state.

With reference to the fifth aspect, in a second implementation of the fifth aspect, the receiver is further configured to receive a third feedback message that is sent by the control device based on the selection operation; and the transmitter is further configured to send the fault information to the control device again.

With reference to the fifth aspect, in a third implementation of the fifth aspect, the processor is specifically configured to: perform average-based statistical processing on the device working status parameter to obtain a user equipment reference average value;

obtain a working status distribution curve diagram of the user equipment based on the device working status parameter;

determine a device critical interval and at least one device interval based on the working status distribution curve diagram; and when the device critical interval is on a left side of the user equipment reference average value, determine the adjacent device interval on a left side of the device critical interval as a faulty device interval, and determine the adjacent device interval on a right side of the device critical interval as a normal device interval; or when the device critical interval is on a right side of the user equipment reference average value, determine the adjacent device interval on a left side of the device critical interval as a normal device interval, and determine the adjacent device interval on a right side of the device critical interval as a faulty device interval.

With reference to the fifth aspect, in a fourth implementation of the fifth aspect, the fault information included in the notification message sent by the transmitter includes fault cause information and fault type information of the faulty user equipment; and the processor is further configured to: determine whether the device working status parameter meets a preset fault condition; and determine a fault cause and a fault type of the faulty user equipment based on the fault condition if the device working status parameter meets the fault condition.

With reference to the fifth aspect, in a fifth implementation of the fifth aspect, the receiver is specifically configured to: receive a setting instruction, where the setting instruction includes a first screening threshold; and the processor is specifically configured to: determine whether the device working status parameter meets the first screening threshold; and if the device working status parameter meets the first screening threshold, determine that the user equipment is normal user equipment; or if the device working status parameter does not meet the first screening threshold, determine that the user equipment is faulty user equipment.

According to a sixth aspect, an embodiment of the present invention provides a control device, where the control device includes a radio frequency module, a processor, a touchscreen controller, and a touchscreen, where
- the radio frequency module is configured to: receive a notification message sent by a cloud server, and transmit the notification message to the processor, where the notification message includes fault information of faulty user equipment determined by the cloud server from at least one user equipment;
- the processor is configured to: obtain the fault information from the notification message, and transmit the fault information to the touchscreen controller;
- the touchscreen controller is configured to transmit the fault information to the touchscreen;
- the touchscreen is configured to: display the fault information, receive a selection operation that is entered by a user based on the fault information, and transmit the selection operation to the touchscreen controller;
- the touchscreen controller is further configured to transmit the selection operation to the processor;
- the processor is further configured to: generate a first feedback message based on the selection operation, and transmit the first feedback message to the radio frequency module; and
- the radio frequency module is further configured to send the first feedback message to the cloud server, where the first feedback message is used to enable the cloud server to send the fault information and attribute information of the user to a maintenance server.

With reference to the sixth aspect, in a first implementation of the sixth aspect, the processor is further configured to: generate a second feedback message based on the selection operation, and transmit the second feedback message to the radio frequency module; and
- the radio frequency module is further configured to send the second feedback message to the cloud server, where the second feedback message is used to enable the cloud server to determine whether the faulty user equipment is still in a faulty state, and if the faulty user equipment is still in the faulty state, the cloud server stops sending the fault information to the control device.

With reference to the sixth aspect, in a second implementation of the sixth aspect, the processor is further configured to: generate a third feedback message based on the selection operation, and transmit the third feedback message to the radio frequency module; and
- the radio frequency module is further configured to send the third feedback message to the cloud server, where the third feedback message is used to enable the cloud server to send the fault information to the control device again.

According to a seventh aspect, an embodiment of the present invention provides a computer readable storage medium, where the computer readable storage medium stores a computer program, and the computer program is executed by a processor included in a cloud server to perform the method in any aspect described above.

According to an eighth aspect, an embodiment of the present invention provides a computer readable storage medium, where the computer readable storage medium stores a computer program, and the computer program is executed by a processor included in a control device to perform the method in any aspect described above.

Therefore, the value-added service implementation method and apparatus, and the cloud server according to the embodiments of the present invention are applied. The cloud server determines faulty user equipment based on obtained device attribute parameters of a plurality of user equipments, and sends fault information to a control device corresponding to the faulty user equipment, so that the control device displays the fault information, and receives a selection operation that is performed by a user based on the fault information. The cloud server communicates with the maintenance server based on a first feedback message sent by the control device to notify the maintenance server of the fault information of the faulty user equipment and attribute information of the user, so that the maintenance server contacts the user based on the attribute information of the user, and maintains the faulty user equipment based on the fault information. Therefore, a fault of a smart household appliance is predicted, fault information of a currently used smart household appliance is provided for a user, and if necessary, services such as maintenance and repair of the smart household appliance are provided for the user, thereby improving user experience.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention shall fall within the protection scope of the present invention.

Figure 1:
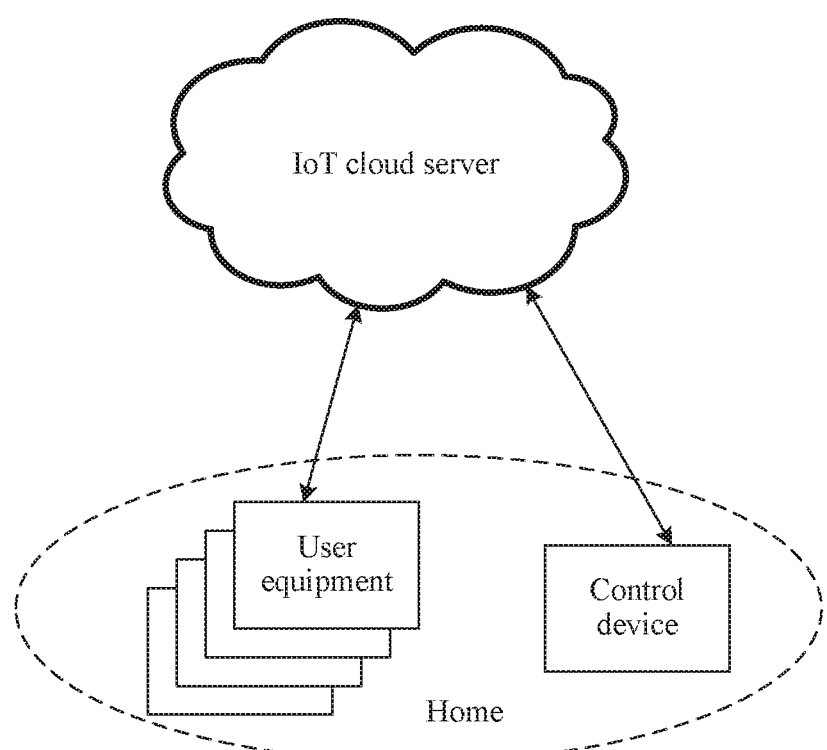
FIG. 1 is a schematic diagram of a network architecture according to an embodiment of the present invention.

FIG. 1 is a schematic diagram of a network architecture to which an embodiment of the present invention can be applied. The network architecture provided in this embodiment of the present invention is the same as a smart household network architecture in the prior art, and includes a plurality of user equipments in a user's home, an Internet of Things (Internet of Things, IoT for short) cloud server (which is described as a cloud server in subsequent description), and a control device.

In this embodiment of the present invention, the user equipment may be specifically a smart household appliance. The smart household appliance may include a smart television, a smart air conditioner, a smart refrigerator, or the like. The control device is specifically a mobile terminal that receives, sends, processes, and displays a message. The mobile terminal may include a mobile phone, a tablet computer, a wearable device, or the like.

As shown in FIG. 1, the control device and the plurality of user equipments are connected to the cloud server by using a wireless network. The cloud server may perform communication and interaction with the user equipments and the control device. For example, the cloud server sends a control instruction to the user equipments and the control device, and receives an execution result sent by the user equipments and the control device, In this embodiment of the present invention, the cloud server identifies whether the user equipments are faulty. After determining faulty user equipment, the cloud server sends fault information of the faulty user equipment to the control device. The control device displays the fault information, and receives a selection operation that is entered by a user based on the fault information. The control device sends a feedback message to the cloud server. After receiving the feedback message sent by the control device, the cloud server correspondingly processes the faulty user equipment based on the feedback message.

Figure 2:
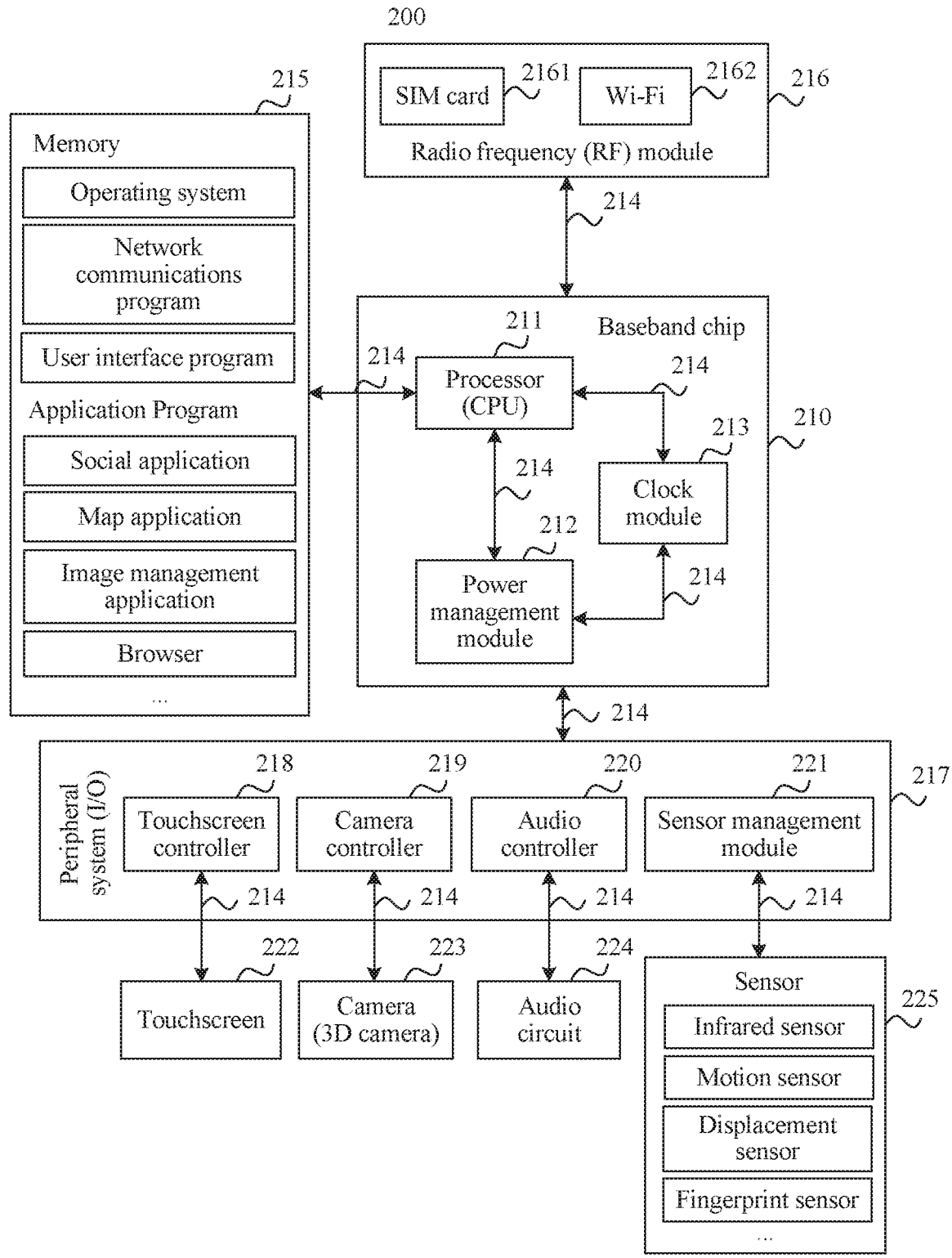
FIG. 2 is a schematic structural diagram of a control device according to an embodiment of the present invention.

FIG. 2 is a schematic structural diagram of a control device according to an embodiment of the present invention. The control device 200 may include a baseband chip 210, a memory 215 (one or more computer readable storage media), a radio frequency (RF) module 216, and a peripheral system 217. These components may communicate with each other by using one or more communications buses 214.

The peripheral system 217 is mainly configured to implement an interaction function between the control device 200 and a user or an external environment, and includes an input/output apparatus of the control device 200. In some embodiments, the peripheral system 217 may include a touchscreen controller 218, a camera controller 219, an audio controller 220, and a sensor management module 221. The controllers may be coupled to respective peripheral devices (for example, a touchscreen 222, a camera 223, an audio circuit 224, and a sensor 225). In some embodiments, the camera 223 may be a 3D camera. It should be noted that the peripheral system 217 may further include another I/O peripheral device.

The touchscreen 222 may be configured to display information entered by a user or present information to a user, for example, may present various menus of the control device 200, or present an interface of a running application program, for example, a button (button), a text (text) input box, a scroll bar (scroll bar), and a menu (menu). The touchscreen 222 may include a touch panel and a display panel. Optionally, the display panel may be configured in a form of a liquid crystal display (Liquid Crystal Display, LCD), an organic light-emitting diode (Organic Light-Emitting Diode, OLED), or the like. Further, the touch panel may cover the display panel. When detecting a touch operation on or near the touch panel, the touch panel transfers the touch operation to a processor 211 to determine a type of a touch event, and then the processor 211 provides corresponding visual output on the display panel based on the type of the touch event. The touch panel and the display panel are used as two independent components to implement input and output functions of the control device 200. However, in some embodiments, the touch panel and the display panel may be integrated to implement the input and output functions of the control device 200.

The baseband chip 210 may include one or more processors 211, a clock module 212, and a power management module 213 through integration. The clock module 212 integrated into the baseband chip 210 is mainly configured to generate a clock required for data transmission and time sequence control for the processor 211. The power management module 213 integrated into the baseband chip 210 is mainly configured to provide a stable and high-precision voltage for the processor 211, the radio frequency module 216, and the peripheral system.

The radio frequency (RF) module 216 is configured to receive and send a radio frequency signal, and mainly integrates a receiver and a transmitter of the control device 200. The radio frequency (RF) module 216 communicates with a communications network and another communications device by using the radio frequency signal. In some embodiments, the radio frequency (RF) module 216 may include but is not limited to an antenna system, an RF transceiver, one or more amplifiers, a tuner, one or more oscillators, a digital signal processor, a codec chip, a SIM card, and a storage medium. In some embodiments, the radio frequency (RF) module 216 may be implemented on a separate chip. Generally, the radio frequency module may be used for wireless transmission such as Bluetooth (English: Bluetooth) transmission, Wireless Fidelity (English: Wireless Fidelity, Wi-Fi for short) transmission, 3rd generation (English: 3rd Generation, 3G for short) mobile communication transmission, 4th generation mobile communication (English: 4th generation mobile communication, 4G for short) transmission, and Zigbee (Zigbee).

The memory 215 is coupled to the processor 211, and is configured to store various software programs and/or a plurality of sets of instructions. In some embodiments the memory 215 may include a high-speed random access memory, and may also include a non-volatile memory, such as one or more disk storage devices, a flash storage device, or another non-volatile solid state storage device. The memory 215 may store an operating system (system for short below), for example, an embedded operating system such as Android, iOS, Windows, or Linux.

The memory 215 may further store a network communications program. The network communications program may be used to communicate with one or more control devices. The memory 215 may further store a user interface program. The user interface program may vividly display content of an application program by using a graphical operation interface, and receive, by using an input control such as a menu, a dialog box, and a key, a control operation performed on the application program by a user.

The memory 215 may further store one or more application programs. As shown in FIG. 2, these application programs may include a social application program (for example, Facebook), an image management application program (for example, album), a map application program (for example, Google map), a browser (for example, Safari or Google Chrome), and the like.

The control device 200 provided in this embodiment of the present invention is merely an example provided in this embodiment of the present invention, and the control device 200 may have more or fewer components than the shown components, and may combine two or more components, or may have different configuration implementations of the components.

In addition, the control device 200 provided in the foregoing embodiment is configured to implement a value-added service implementation method in an embodiment of the present invention.

It may be understood that the memory 215 stores various software programs and/or a plurality sets of instructions. The radio frequency module 216, the processor 211, the touchscreen controller 218, and the touchscreen 223 implement functions of the control device by invoking the various software programs and/or the plurality of sets of instructions in the memory 215.

Specifically, the radio frequency module 216 receives a notification message sent by a cloud server, and transmits the notification message to the processor 211. The notification message includes fault information of faulty user equipment determined by the cloud server from at least one user equipment. The processor 211 receives the notification message transmitted by the radio frequency module 216, obtains the fault information from the notification message, and transmits the fault information to the touchscreen controller 218. The touchscreen controller 218 receives the fault information transmitted by the processor 211, and transmits the fault information to the touchscreen 223.

The touchscreen 223 receives the fault information transmitted by the touch controller 218, and displays the fault information, so that a user views the fault information. The user enters a selection operation to the touchscreen 223 based on the fault information. The touchscreen 223 receives the selection operation, and transmits the selection operation to the touchscreen controller 218.

The touchscreen controller 218 receives the selection operation transmitted on the touchscreen 223, and transmits the selection operation to the processor 211. The processor 211 receives the selection operation transmitted by the touchscreen controller 218, generates a first feedback message based on the selection operation, and transmits the first feedback message to the radio frequency module 216.

The radio frequency module 216 receives the first feedback message transmitted by the processor 211, and sends the first feedback message to the cloud server. The first feedback message is used to enable the cloud server to send the fault information and attribute information of the user to a maintenance server.

Further, the processor 211 further generates a second feedback message based on the selection operation, and transmits the second feedback message to the radio frequency module 216. The radio frequency module 216 receives the second feedback message transmitted by the processor 211, and sends the second feedback message to the cloud server. The second feedback message is used to enable the cloud server to determine whether the faulty user equipment is still in a faulty state. If the faulty user equipment is still in the faulty state, the cloud server stops sending the fault information to the control device, Further, the processor 211 further generates a third feedback message based on the selection operation, and transmits the third feedback message to the radio frequency module 216. The radio frequency module 216 receives the third feedback message transmitted by the processor 211, and sends the third feedback message to the cloud server. The third feedback message is used to enable the cloud server to send the fault information to the control device again.

Therefore, the control device provided in this embodiment of the present invention is applied. After determining the faulty user equipment from the at least one user equipment, the cloud server sends the fault information of the faulty user equipment to the control device corresponding to the faulty user equipment. The control device displays the fault information, and receives the selection operation that is entered by the user based on the fault information. The control device sends the first feedback message for the selection operation to the cloud server. The cloud server communicates with the maintenance server based on the first feedback message to notify the maintenance server of the fault information of the faulty user equipment and the attribute information of the user, so that the maintenance server contacts the user based on the attribute information of the user, and maintains the faulty user equipment based on the fault information. Therefore, a fault of a smart household appliance is predicted, fault information of a currently used smart household appliance is provided for a user, and if necessary, services such as maintenance and repair of the smart household appliance are provided for the user, thereby improving user experience.

Figure 3:
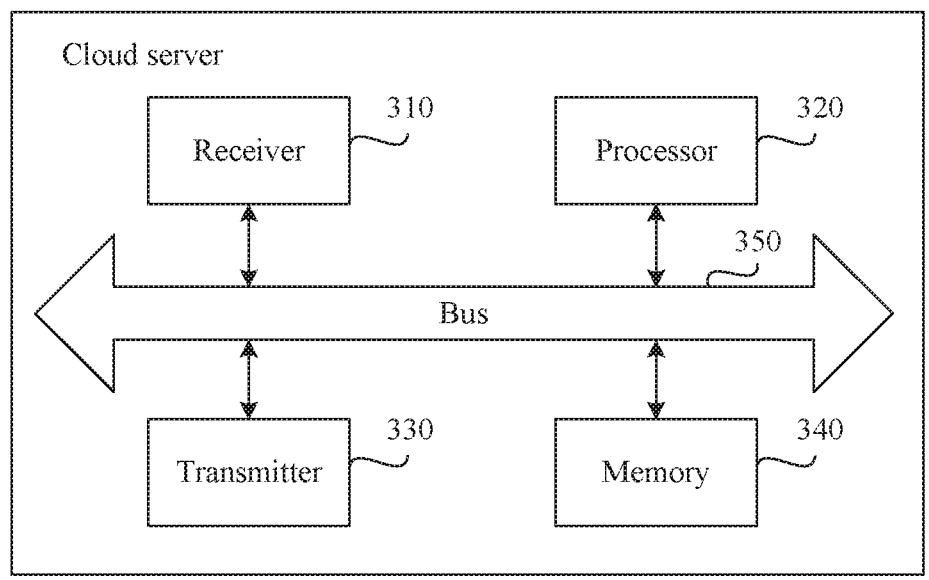
FIG. 3 is a schematic structural diagram of a cloud server according to an embodiment of the present invention.

FIG. 3 is a schematic structural diagram of a cloud server according to an embodiment of the present invention. The cloud server 300 may include a receiver 310, a processor 320, a transmitter 330, and a memory 340 (one or more readable storage media). These components may communicate with each other by using one or more communications buses 350.

The bus 350 may be a peripheral component interconnect (English: peripheral component interconnect, PCI for short) bus, an extended industry standard architecture (English: extended industry standard architecture, EISA for short) bus, or the like. The bus may be classified into an address bus, a data bus, a control bus, or the like. For ease of indication, the bus is indicated by using only one bold line in FIG. 3. However, it does not indicate that there is only one bus or only one type of bus.

The receiver 310 and the transmitter 330 are communications interfaces for performing communication and interaction with other devices by the cloud server, and may be wired communications interfaces, wireless communications interfaces, or a combination thereof. The wired communications interface may be, for example, an Ethernet interface. The Ethernet interface may be an optical interface, an electrical interface, or a combination thereof. The wireless communications interface may be a WLAN interface, a cellular network communications interface, a combination thereof, or the like.

The processor 320 may be a central processing unit (English: central processing unit, CPU for short), a network processor (English: network processor, NP for short), or a combination of a CPU and an NP.

The processor 320 may further include a hardware chip. The hardware chip may be an application-specific integrated circuit (English: application-specific integrated circuit, ASIC for short), a programmable logic device (English: programmable logic device, PLD for short), or a combination thereof. The PLD may be a complex programmable logic device (English: complex programmable logic device, CPLD for short), a field programmable gate array (English: field programmable gate array, FPGA for short), generic array logic (English: generic array logic, GAL for short), or any combination thereof.

The memory 340 may include a volatile memory (English: volatile memory), such as a random access memory (English: random access memory, RAM for short). Alternatively, the memory may include a non-volatile memory (English: non-volatile memory), such as a flash memory (English: flash memory), a hard disk drive (English: hard disk drive, HDD for short), or a solid-state drive (English: solid-state drive, SSD for short). Alternatively, the memory 340 may include a combination of the foregoing types of memories.

The memory 340 may be further configured to store a program instruction. When the processor 320 is a CPU, the processor 320 invokes the program instruction stored in the memory 340. When the processor 320 is hardware, such as an FPGA or ASIC, the processor 320 does not require the memory 340 to store the program instruction. A skilled person may directly write the program instruction into a hardware processor of the FPGA or the ASIC, and the FPGA or the ASIC may directly execute the program instruction.

In addition, the cloud server provided in the foregoing embodiment is configured to implement a value-added service implementation method in an embodiment of the present invention.

Specifically, the processor 320 obtains a device attribute parameter of at least one user equipment. The device attribute parameter includes a device working status parameter. The processor 320 may obtain the device attribute parameter from a database of the cloud server. Alternatively, the receiver 310 receives a device attribute parameter sent by a control device, and transmits the device attribute parameter to the processor 320.

After obtaining the device attribute parameter, the processor 320 determines faulty user equipment from the at least one user equipment based on the device working status parameter. The processor 320 generates a notification message. The notification message includes fault information of the faulty user equipment. The processor 320 transmits the notification message to the transmitter 330.

The transmitter 330 receives the notification message transmitted by the processor 320, and sends the notification message to a control device corresponding to the faulty user equipment. The notification message is used to enable the control device to display the fault information, and receive a selection operation that is performed by a user based on the fault information.

The receiver 310 receives a first feedback message that is sent by the control device based on the selection operation, and transmits the first feedback message to the processor 320. The processor 320 obtains, from the database and based on the first feedback message, attribute information of the user corresponding to the faulty user equipment, and transmits the fault information and the attribute information of the user to the transmitter 330.

The transmitter 330 receives the fault information and the attribute information of the user that are transmitted by the processor 320, and sends the fault information and the attribute information of the user to a maintenance server.

Further, the receiver 310 further receives a second feedback message that is sent by the control device based on the selection operation, and transmits the second feedback message to the processor 320. The processor 320 determines, based on the second feedback message, whether the faulty user equipment is still in a faulty state. If the faulty user equipment is still in the faulty state, the processor 320 sends, to the transmitter 330, an instruction of stopping sending the fault information to the control device. The transmitter 330 receives the instruction sent by the processor 320, and stops sending the fault information to the control device according to the instruction.

Further, the receiver 310 further receives a third feedback message that is sent by the control device based on the selection operation, and transmits the third feedback message to the processor 320. The processor 320 sends, based on the third feedback message to the transmitter 330, an instruction of sending the fault information again to the control device. The transmitter 330 receives the instruction sent by the processor 320, and sends the fault information to the control device again according to the instruction.

Further, that the processor 320 determines faulty user equipment from the at least one user equipment based on the device working status parameter is specifically as follows:

The processor 320 performs average-based statistical processing on the device working status parameter to obtain a user equipment reference average value. The processor 320 obtains a working status distribution curve diagram of the user equipment based on the device working status parameter. The processor 320 determines a device critical interval and at least one device interval based on the working status distribution curve diagram. When the device critical interval is on a left side of the user equipment reference average value, the processor 320 determines an adjacent device interval on a left side of the device critical interval as a faulty device interval, and the processor 320 determines an adjacent device interval on a right side of the device critical interval as a normal device interval. When the device critical interval is on a right side of the user equipment reference average value, the processor 320 determines an adjacent device interval on a left side of the device critical interval as a normal device interval, and the processor 320 determines an adjacent device interval on a right side of the device critical interval as a faulty device interval.

Further, the fault information generated by the processor 320 includes fault cause information and fault type information of the faulty user equipment. The processor 320 further transmits the fault cause information and the fault type information to the transmitter 330, so that when the transmitter 330 sends the notification message to the control device, the fault cause information and the fault type information of the user equipment are carried.

Before the transmitter 330 sends the notification message to the control device, the processor 320 further determines whether the device working status parameter meets a preset fault condition. If the device working status parameter meets the fault condition, the processor 320 determines a fault cause and a fault type of the faulty user equipment based on the fault condition.

Figure 4:
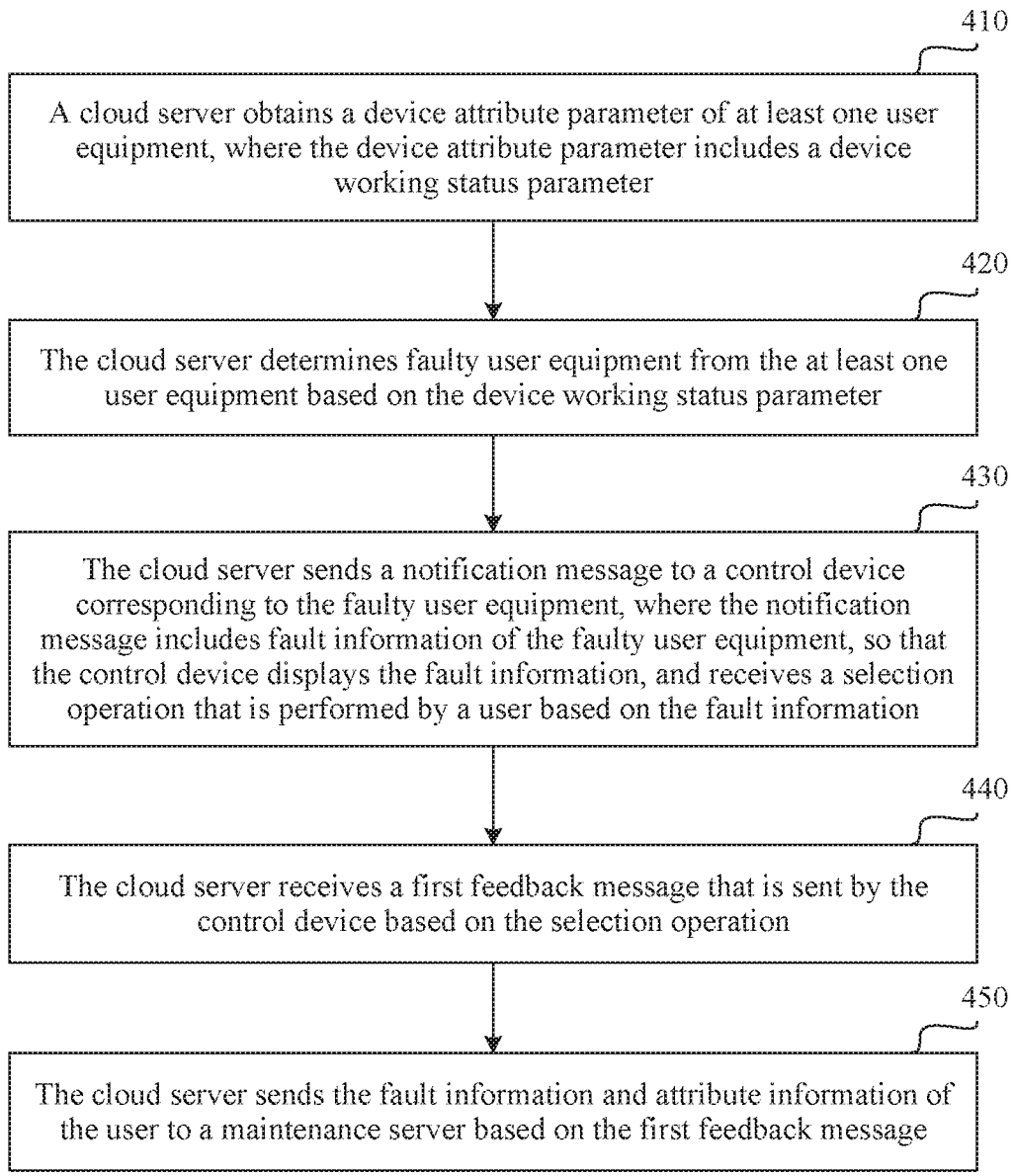
FIG. 4 is a flowchart of a value-added service implementation method according to an embodiment of the present invention.

Further, the receiver 310 further receives a setting instruction. The setting instruction is entered by a skilled person. The setting instruction includes a first screening threshold. The receiver 310 transmits the setting instruction to the processor 320. The processor 320 receives the setting instruction, obtains the first screening threshold from the setting instruction, and determines whether the device working status parameter meets the first screening threshold. If the device working status parameter meets the first screening threshold, the processor 320 determines that the user equipment is normal user equipment. If the device working status parameter does not meet the first screening threshold, the processor 320 determines that the user equipment is faulty user equipment A solution provided in an embodiment of the present invention is described below with reference to FIG. 4. FIG. 4 is a flowchart of a value-added service implementation method according to this embodiment of the present invention. The method is performed by a cloud server, and specifically includes the following steps.

Step 410: The cloud server obtains a device attribute parameter of at least one user equipment, where the device attribute parameter includes a device working status parameter.

Specifically, the cloud server may obtain the device attribute parameter of the at least one user equipment in a plurality of manners. For example, the cloud server obtains the device attribute parameter from a database, or the cloud server receives the device attribute parameter reported by the user equipment. Manners of obtaining the device attribute parameter of the user equipment by the cloud server are not limited to the two manners.

In an example, the database of the cloud server stores the device attribute parameter of the at least one user equipment. The device attribute parameter includes the device working status parameter. The cloud server obtains the device working status parameter of the at least one user equipment from the database.

It should be noted that the device attribute parameter of the user equipment that is stored in the database is a device attribute parameter of the user equipment within a period of time, for example, a device attribute parameter of the user equipment within one month.

In another example, before the user equipment is delivered, a skilled person sets the user equipment to a real-time reporting mode for a device attribute parameter. Alternatively, after the user equipment is powered on, a user sets the user equipment to a real-time reporting mode for a device attribute parameter. The user equipment is wirelessly connected to the cloud server, and sends the device attribute parameter of the user equipment to the cloud server in real time. The device attribute parameter includes the device working status parameter. The cloud server obtains the device attribute parameter from the user equipment.

It should be noted that when sending the device attribute parameter to the cloud server, the user equipment in the real-time reporting mode for a device attribute parameter further sends, to the cloud server, attribute information of a control terminal corresponding to the user equipment and attribute information of the user. The cloud server stores the attribute information of the control terminal corresponding to the user equipment and the attribute information of the user.

The device attribute parameter of the at least one user equipment, obtained by the cloud server, is used as a basis for subsequently determining whether the user equipment is faulty.

In this step, the at least one user equipment may be specifically user equipment in a same or similar area, and the at least one user equipment belongs to a same type. For example, the cloud server obtains a device attribute parameter of at least one smart air conditioner.

In an example, the device working status parameter may be specifically a user setting parameter or a working setting parameter. The user setting parameter is specifically a parameter, set by the user, for an initial working status of the user equipment. A smart air conditioner is used as an example. A user may set a working mode of the smart air conditioner depending on a season. The smart air conditioner is set to a cooling mode in summer, and is set to a heating mode in winter. Working setting parameter is specifically a parameter in a working process of the user equipment. A smart air conditioner is used as an example. The smart air conditioner measures actual indoor and outdoor temperatures, and adjusts a working temperature based on a change of the actual temperatures.

Step 420: The cloud server determines faulty user equipment from the at least one user equipment based on the device working status parameter.

Specifically, after obtaining the device working status parameter of the user equipment, the cloud server determines a status of the user equipment based on the device working status parameter, so as to determine the faulty user equipment.

Step 430: The cloud server sends a notification message to a control device corresponding to the faulty user equipment, where the notification message includes fault information of the faulty user equipment, so that the control device displays the fault information, and receives a selection operation that is entered by a user based on the fault information.

Specifically, after determining the faulty user equipment, the cloud server generates the fault information, and finds, from the database, the control device corresponding to the faulty user equipment. The cloud server sends the notification message to the found control device. The notification message includes the fault information. After receiving the fault information, the control device displays the fault information.

In this embodiment of the present invention, the notification message further includes prompt information used to prompt the user how to process the faulty user equipment. The prompt information is used to provide the user with a recommended measure used to process the faulty user equipment. For example, the prompt information is specifically "maintain the faulty user equipment", or the prompt information is specifically "not maintain the faulty user equipment", or the prompt information is specifically "keep observing for later prompt". The user may choose whether to maintain the faulty user equipment based on a current situation. If the user expects to immediately maintain the faulty equipment, the user selects a prompt key of "maintain the faulty equipment", and the control device receives the selection operation entered by the user.

Step 440: The cloud server receives a first feedback message that is sent by the control device based on the selection operation.

Specifically, after receiving the selection operation entered by the user, the control device generates the first feedback message, and sends the first feedback message to the cloud server.

In an example, if the user expects to immediately maintain the faulty user equipment, the user selects the prompt key of "maintain the faulty user equipment". The control device receives the selection operation of the user, generates the first feedback message based on the selection operation, and sends the first feedback message to the cloud server.

It may be understood that the first feedback message carries a message "maintain the faulty user equipment" selected by the user.

Step 450: The cloud server sends the fault information and attribute information of the user to a maintenance server based on the first feedback message.

Specifically, the cloud server receives the first feedback message, and determines, based on the first feedback message, that the user expects to immediately maintain the faulty user equipment. In this case, the cloud server sends the fault information generated in step 430 to the maintenance server. In addition, the cloud server further obtains, from the database, the attribute information of the user corresponding to the faulty user equipment, and sends the attribute information of the user to the maintenance server. The maintenance server contacts the user based on the attribute information of the user, and maintains the faulty user equipment based on the fault information.

Therefore, the value-added service implementation method provided in this embodiment of the present invention is applied. The cloud server determines faulty user equipment based on obtained device attribute parameters of a plurality of user equipments, and sends fault information to a control device corresponding to the faulty user equipment, so that the control device displays the fault information, and receives a selection operation that is performed by a user based on the fault information. The cloud server communicates with the maintenance server based on a first feedback message sent by the control device to notify the maintenance server of the fault information of the faulty user equipment and attribute information of the user, so that the maintenance server contacts the user based on the attribute information of the user, and maintains the faulty user equipment based on the fault information. Therefore, a fault of a smart household appliance is predicted, fault information of a currently used smart household appliance is provided for a user, and if necessary, services such as maintenance and repair of the smart household appliance are provided for the user, thereby improving user experience.

Optionally, before step 410 in this embodiment of the present invention, if the cloud server obtains the device attribute parameter from the database of the cloud server, the method further includes a step of receiving, by the cloud server, the device attribute parameter reported by the user equipment, and storing the device attribute parameter in the database.

Specifically, the user equipment is wirelessly connected to the cloud server, and the cloud server separately sends a reporting instruction to the user equipment connected to the cloud server. The user equipment reports the device attribute parameter of the user equipment to the cloud server according to the reporting instruction. After receiving the device attribute parameter, the cloud server stores the device attribute parameter in the database based on a type of the user equipment.

For example, a device attribute parameter of a smart air conditioner is stored, and a device attribute parameter of a smart television is stored. It may be understood that the database may further store the attribute information of the control terminal corresponding to the user equipment, the attribute information of the user, and the like.

Optionally, in step 420 in this embodiment of the present invention, the cloud server determines the status of the user equipment based on the device working status parameter, so as to determine the faulty user equipment. This may be implemented in the following manner.

Specifically, after obtaining the device working status parameter, the cloud server performs average-based statistical processing on the device working status parameter to obtain a user equipment reference average value. The user equipment reference average value is an average value of a plurality of device working status parameters.

The cloud server obtains a working status distribution curve diagram of the user equipment based on the device working status parameter, and the cloud server determines a device critical interval and at least one device interval based on the working status distribution curve diagram. The device critical interval is specifically an interval in which neither a user equipment average value nor a user equipment variance changes and that is between two device intervals.

When the device critical interval is on a left side of the user equipment reference average value, the cloud server determines an adjacent device interval on a left side of the device critical interval as a faulty device interval, and determines an adjacent device interval on a right side of the device critical interval as a normal device interval.

When the device critical interval is on a right side of the user equipment reference average value, the cloud server determines an adjacent device interval on a left side of the device critical interval as a normal device interval, and determines an adjacent device interval on a right side of the device critical interval as a faulty device interval.

In this embodiment of the present invention, the cloud server determines the device critical interval in the following manner, Specifically, when performing average-based statistical processing on the device working status parameter, the cloud server further performs deviation-degree-based statistical processing on the device working status parameter to obtain a user equipment reference variance. The user equipment reference variance is a degree to which each device working status parameter deviates from the user equipment reference average value.

The cloud server determines a first screening threshold based on the working status distribution curve diagram. The first screening threshold is used to determine the device critical interval.

The user equipment reference average value and the user equipment reference variance are used as a reference, and the cloud server gradually changes the first screening threshold. The first screening threshold is gradually changed in the following specific manner. The cloud server fixes a parameter value at one end of the working status distribution curve diagram, and gradually moves the first screening threshold towards the reference at the other end of the working status distribution curve diagram.

When the first screening threshold is moved to any interval (the device critical interval or the device interval), the cloud server calculates a user equipment average value and a user equipment variance in the interval, and determines whether the user equipment average value and the user equipment variance in the device interval change. If neither the user equipment average value nor the user equipment variance in the interval changes, the cloud server determines that the interval is the device critical interval. If the user equipment average value or the user equipment variance changes, the cloud server determines that the interval is the device interval.

A specific example is provided below.

In an example, outdoor unit temperature parameters of a plurality of smart air conditioners are used as an example for description. In this embodiment of the present invention, the outdoor unit temperature parameters of the smart air conditioners are working setting parameters.

Figure 5:
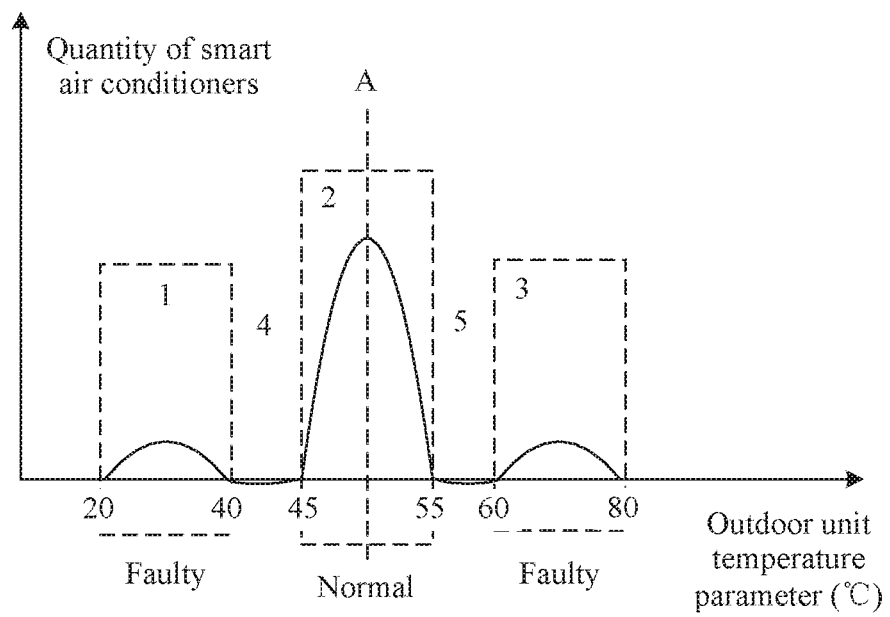
FIG. 5 is a working status distribution curve diagram of user equipment according to an embodiment of the present invention.

After obtaining the outdoor unit temperature parameters of the plurality of smart air conditioners, the cloud server establishes a coordinate system by using the outdoor unit temperature parameter as horizontal coordinates (an X axis) and using quantities of smart air conditioners that are corresponding to all the outdoor unit temperature parameters as vertical coordinates (a Y axis) to obtain a working status distribution curve diagram of the user equipment, as shown in FIG. 5. In FIG. 5, the outdoor unit temperature parameters range from 20° C. to 80° C., and as shown smart controls of each of the air conditioners varies at each temperature point. The cloud server determines three smart air conditioner intervals (intervals 1, 2, and 3 in FIG. 5) based on the working status distribution curve diagram In addition, the cloud server further determines two device critical intervals (intervals 4 and 5 in FIG. 5).

The cloud server performs average-based statistical processing on the outdoor unit temperature parameters to obtain a user equipment reference average value. The user equipment reference average value is an average temperature value of the plurality of outdoor unit temperature parameters, for example, a dashed line A in FIG. 5.

The cloud server identifies positions of the device critical intervals and the device intervals. When the device critical interval is on a left side of the user equipment reference average value, the cloud server determines the adjacent interval 1 on a left side of the interval 4 as a faulty device interval, and determines the adjacent interval 2 on a right side of the interval 4 as a normal device interval. When the device critical interval is on a right side of the user equipment reference average value, the cloud server determines the adjacent interval 2 on a left side of the interval 5 as a normal device interval, and determines the adjacent interval 3 on a right side of the interval 5 as a faulty device interval.

In this example, the cloud server determines the two device critical intervals (the intervals 4 and 5 in FIG. 5) in the following specific manner:

When performing average-based statistical processing on the outdoor unit temperature parameters, the cloud server further performs deviation-degree-based statistical processing on the outdoor unit temperature parameters to obtain a user equipment reference variance. The user equipment reference variance is a degree to which each outdoor unit temperature value deviates from the user equipment reference average value.

The cloud server determines a first screening threshold based on the working status distribution curve diagram. The first screening threshold changes with parameters. In this example, the first screening threshold is a temperature value.

The user equipment reference average value and the user equipment reference variance are used as a reference. The cloud server changes the first screening threshold, to be specific, fixes an outdoor unit temperature value at one end of the working status distribution curve diagram, and gradually increases/decreases the first screening threshold from an outdoor unit temperature value at the other end of the working status distribution curve diagram, so that the first screening threshold is gradually close to the user equipment reference average value.

It should be noted that in FIG. 5, there are a plurality of smart air conditioner intervals in the working status distribution curve diagram of the user equipment, and the outdoor unit temperature parameters range widely. Therefore, in this embodiment of the present invention, the cloud server needs to determine two screening thresholds.

When the cloud server determines whether an interval is the device critical interval, the cloud server fixes a temperature value on a rightmost side, and gradually increases the first screening threshold from a leftmost side (for example, the temperature value on the rightmost side is fixed at 80° C., and the determined first selected screening threshold 20° C. gradually increases to 21° C., 22° C., 23° C.). Or the cloud server fixes a temperature value on a leftmost side, and gradually decreases the first screening threshold from a rightmost side (for example, the temperature value on the leftmost side is fixed at 20° C. and the determined selected value gradually increases to 79° C., 78° C. and 77° C.).

When the first screening threshold is moved to an interval, the cloud server calculates a user equipment average value and a user equipment variance in the interval, and determines whether the user equipment average value and the user equipment variance in the interval change. If neither the user equipment average value nor the user equipment statistical-variance changes, the cloud server determines that the interval is the device critical interval (the interval 4 in FIG. 5).

Optionally, in this embodiment of the present invention, if the cloud server cannot accurately determine the normal device interval, the faulty device interval, and the device critical interval based on the working status distribution curve diagram of the user equipment, the cloud server may perform fault identification on the user equipment based on a received setting instruction, and further determine the normal user equipment and the faulty user equipment. Therefore, fault identification can be more comprehensively and accurately performed on the user equipment in this step.

Specifically, the cloud server obtains a working status distribution curve diagram of the user equipment based on the device working status parameter. The cloud server determines a device interval based on the working status distribution curve diagram. The cloud server receives the setting instruction. In this embodiment of the present invention, the setting instruction may be entered by a skilled person, and the setting instruction includes a second screening threshold. The cloud server determines whether the device working status parameter meets the second screening threshold. If the device working status parameter meets the second screening threshold, the cloud server determines that the user equipment is normal user equipment. If the device working status parameter does not meet the second screening threshold, the cloud server determines that the user equipment is faulty user equipment.

In an example, outdoor unit temperature parameters of a plurality of smart air conditioners are used as an example for description. In this embodiment of the present invention, the outdoor unit temperature parameters of the smart air conditioners are working setting parameters.

Figure 6:
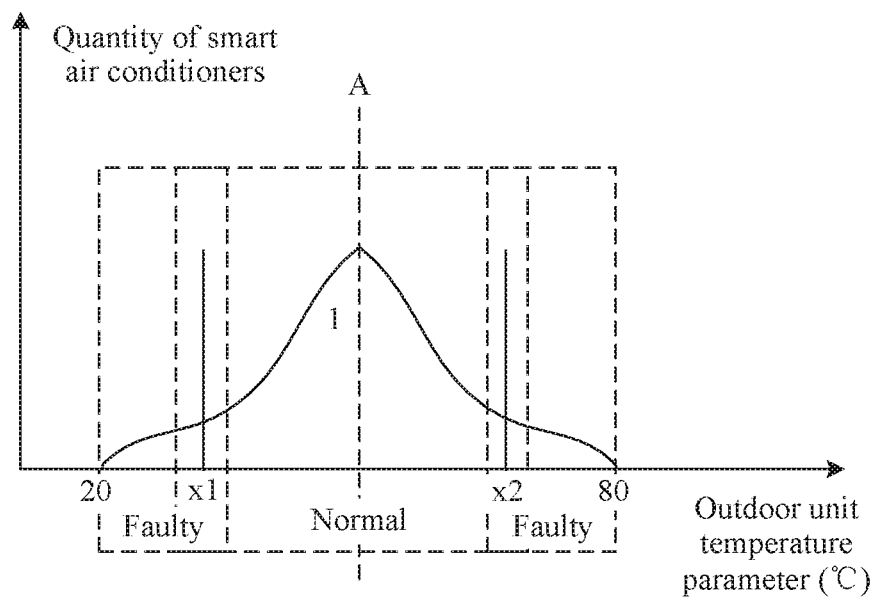
FIG. 6 is another working status distribution curve diagram of user equipment according to an embodiment of the present invention.

After obtaining the outdoor unit temperature parameters of the plurality of smart air conditioners, the cloud server establishes a coordinate system by using the outdoor unit temperature parameter as horizontal coordinates (an X axis) and using quantities of smart air conditioners that are corresponding to all the outdoor unit temperature parameters as vertical coordinates (a Y axis) to obtain a working status distribution curve diagram of the user equipment, as shown in FIG. 6. In FIG. 6, the outdoor unit temperature parameters range from 20° C. to 80° C. a smart control of each of the smart air conditioners varies at each temperature point. The cloud server obtains one smart air conditioner interval (an interval 1 in FIG. 6) based on the working status distribution curve diagram of the user equipment.

A skilled person determines a second screening threshold based on the working status distribution curve diagram of the user equipment. The second screening threshold changes with parameters. In this example, the second screening threshold is a temperature value.

It should be noted that in this example, the cloud server still performs average-based statistical processing and deviation-degree-based statistical processing on the outdoor unit temperature parameters to obtain a user equipment reference average value and a user equipment reference variance.

It may be understood that the skilled person may determine the second screening threshold based on the user equipment reference average value, the user equipment reference variance, and experience accumulated by the skilled person.

In FIG. 6, there is one smart air conditioner interval in the working status distribution curve diagram of the user equipment, and the outdoor unit temperature parameters range widely. Therefore, the cloud server needs to determine two screening thresholds, so as to determine whether there is a faulty device interval in the interval 1.

The cloud server receives a setting instruction entered by the skilled person. The setting instruction includes the second screening threshold (x1 is 25° C., and x2 is 65° C.). The cloud determines whether every outdoor machine temperature parameter meets the second screening threshold. If the outdoor unit temperature parameter meets the second screening threshold, the cloud server determines that user equipment corresponding to the outdoor unit temperature parameter is normal user equipment. If the device working status parameter does not meet the second screening threshold, the cloud server determines that user equipment corresponding to the outdoor unit temperature parameter is faulty user equipment In FIG. 6, the cloud server determines user equipment corresponding to an outdoor unit temperature parameter that is less than x1 and user equipment corresponding to an outdoor unit temperature parameter that is greater than x2 as faulty user equipment, and determines user equipment corresponding to an outdoor unit temperature parameter that is greater than x1 and less than x2 as normal user equipment.

Optionally, before step 430 in this embodiment of the present invention, the method further includes a step of determining a fault cause and a fault type of the faulty user equipment by the cloud server. The cloud server adds the fault cause and the fault type of the faulty user equipment to the fault information in this step, so that the user can clearly know the cause and type of the fault user equipment, and select a suitable processing manner.

Specifically, the cloud server determines whether the device working status parameter meets a preset fault condition. If the device working status parameter meets the fault condition, the cloud server determines the fault cause and the fault type of the faulty user equipment based on the fault condition.

Further, the foregoing smart air conditioner is used as an example, the device working status parameter is the outdoor unit temperature parameter of the smart air conditioner, and the preset fault condition is an outdoor unit temperature fault range (for example, less than 40° C. or greater than 60° C.). If equipment in the interval 1, fault cause information is inappropriate installation of an outdoor unit, and fault type information is a low temperature of the outdoor unit. In a case of faulty user equipment in the interval 3, fault cause information is inappropriate installation of an outdoor unit, and fault type information is a high temperature of the outdoor unit.

Figure 7:
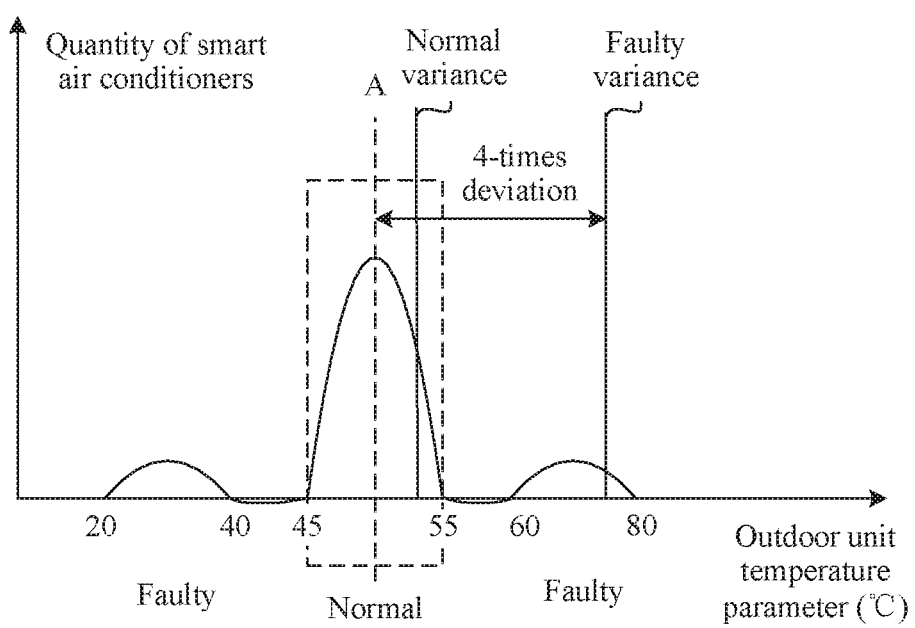
FIG. 7 is a schematic diagram of fault information according to an embodiment of the present invention.

The fault information may further include information about a specific deviation proportion of the faulty user equipment to the normal user equipment, as shown in FIG. 7. In FIG. 7, a value of a deviation proportion of a parameter of the faulty user equipment to a parameter of the normal user equipment is provided, and the user may more visually determine a current running status of the faulty user equipment because of display of information about the deviation proportion. In an example, the information about the deviation proportion is specifically as follows: "An outdoor unit temperature of this device is higher than temperatures of 98.6% of the other devices, and a deviation proportion of this device is four times a deviation proportion of normal user equipment."

The cloud server may further preset a plurality of fault conditions based on different device working status parameters, and determine the fault cause and the fault type of the faulty user equipment by comparing a device working status parameter and a single fault condition corresponding to the device working status parameter.

In an example, when the user uses a smart air conditioner, device working status parameters 1) an outdoor unit temperature of the smart air conditioner, and 2) a specified working temperature range are generated. For example, a working temperature range allowed to be set by a smar air conditioner is 17° C. to 30° C. and a temperature range, set by most users, is 23° C. to 26° C.° C. to 26° C.

In a city, a temperature is relatively high in summer, for example, an outdoor temperature is above 35° C. Therefor predetermined Fault condition 1: A normal range of an outdoor unit temperature of a smart air conditioner is 45° C.-55 C, outdoor machine temperature fault range temperature less than 40° C. or greater than 60 C; Fault condition 2) if temperature, set by a user, is usually 23° C.-26° C. and temperature is an indoor temperature less than 23° C. or greater than 26° C.

The cloud server determines the fault cause and the fault type of the faulty user equipment by separately comparing the working status parameters and the fault conditions corresponding to the working status parameters.

The cloud server determines whether the outdoor unit temperature of the smart air conditioner meets the fault condition 1. If the outdoor unit temperature is determined as very high and reaches 65° C. then the fault cause is "incorrect installation of an outdoor unit", and a fault type is "a high temperature of the outdoor unit". If the outdoor unit temperature is determined as very low and reaches 25 C, the fault cause is "inappropriate installation of an outdoor unit", and a fault type is "a low temperature of the outdoor unit".

If the cloud server determines that ml indoor temperature, set by the user, is very low and reaches 18° C., the fault cause is "incorrect user setting" or "poor heat insulation performance of a room", and a fault type is "a low indoor temperature". If the cloud server determines that an indoor temperature, set by the user, is very high and reaches 28° C. the fault cause is "incorrect user setting" or "poor heat insulation performance of a room", and a fault type is "a high indoor temperature".

It may be understood that the cloud server compares the device working status parameter and the single fault condition in the foregoing example for description. During actual application, the cloud server may further determine the fault cause and the fault type of the faulty user equipment by jointly comparing the device working status parameter and a plurality of fault conditions. A determining process thereof is similar to that in the foregoing example, and is not described herein main.

Optionally, in this embodiment of the present invention, the method further includes a step of receiving, by the cloud server, a second feedback message or a third feedback message that is sent by the control device based on the selection operation of the user. In this step, the cloud server processes the faulty user equipment based on a selection of the user.

Specifically, the control device displays the fault information and the prompt information, and receives the selection operation that is entered by the user based on the fault information and the prompt information.

The prompt information provided in step 430 is used as an example. In an example, the user refuses to maintain the faulty user equipment, and the user selects a prompt key of "not maintain the faulty user equipment". The control device receives the selection operation entered by the user, generates a second feedback message based on the selection operation, and sends the second feedback message to the cloud server.

The cloud server receives the second feedback message, and determines, based on the second feedback message, that the user refuses to maintain the faulty user equipment. The cloud server determines again whether the faulty user equipment is still in a faulty state. If the faulty user equipment is still in the faulty state, the cloud server stops sending the fault information to the control device.

In another example, the user does not expect to immediately maintain the faulty user equipment, and the user selects a prompt key of "keep observing for later prompt". The control device receives the selection operation entered by the user, generates a third feedback message based on the selection operation, and sends the third feedback message to the cloud server.

The cloud server receives the third feedback message, and determines, based on the third feedback message, that the user does not expect to immediately maintain the faulty user equipment. When the cloud server subsequently determines that the faulty user equipment is in the faulty state again, the cloud server sends the fault information to the control device again.

Optionally, before step 430 in this embodiment of the present invention, the method further includes a step of determining, by the cloud server, whether the notification message has been sent to the control device, and identifying a feedback from the user. In this step, the cloud server may send the notification message depending on the feedback from the user, thereby improving user experience.

Specifically, the cloud server determines whether the notification message has been sent to the control device. If the notification message is not sent to the control device, the cloud server sends the notification message to the control device. If the notification message has been sent to the control device, the cloud server determines whether the control device has sent the second feedback message. If the control device does not send the second feedback message, the cloud server sends the notification message to the control device. If the control device has sent the second feedback message, the cloud server does not send the notification message to the control device.

Figure 8:
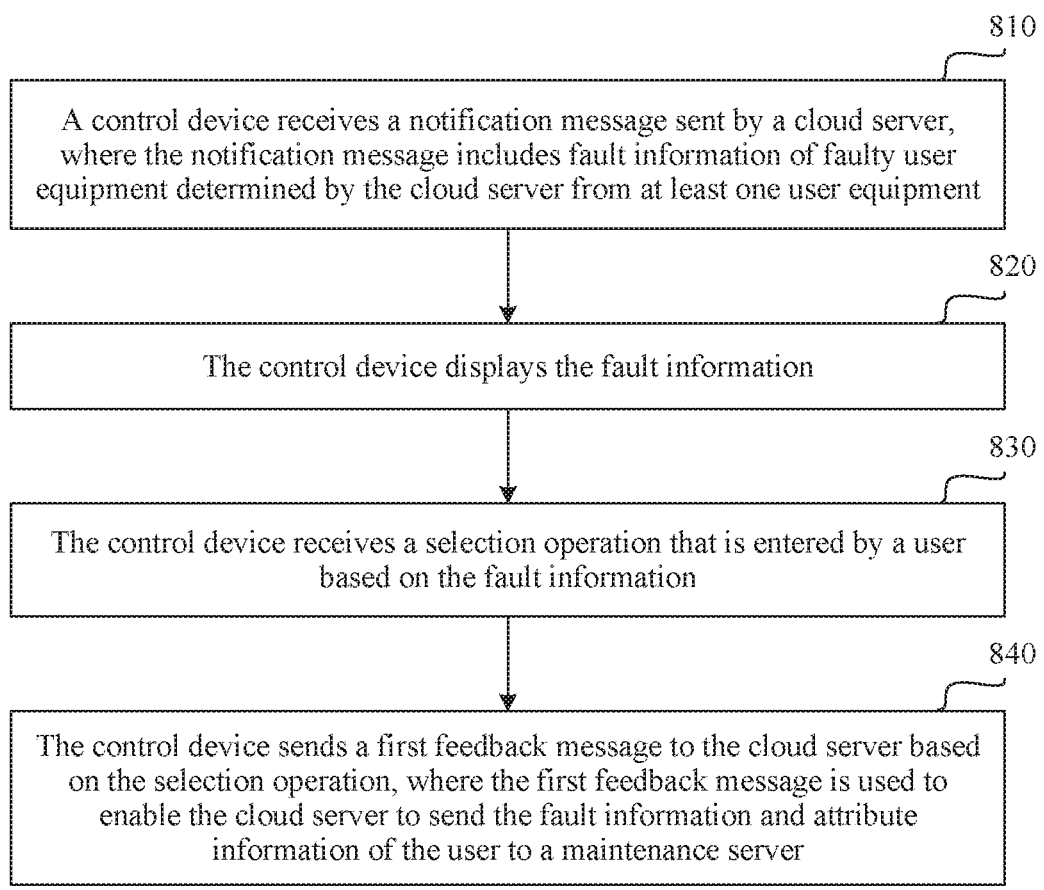
FIG. 8 is a flowchart of another value-added service implementation method according to an embodiment of the present invention.

A solution provided in an embodiment of the present invention is described below with reference to FIG. 8. FIG. 8 is another flowchart of a value-added service implementation method according to this embodiment of the present invention. The method is performed by a control device, and specifically includes the following steps.

Step 810: The control device receives a notification message sent by a cloud server, where the notification message includes fault information of faulty user equipment determined by the cloud server from at least one user equipment.

Specifically, the cloud server obtains a device attribute parameter of the at least one user equipment. The device attribute parameter includes a device working status parameter. The cloud server determines the faulty user equipment from the at least one user equipment based on the device working status parameter.

The cloud server generates the fault information, and finds the control device corresponding to the faulty user equipment from a database. The cloud server sends the notification message to the control device. The notification message includes the fault information of the faulty user equipment.

In the foregoing embodiment, a process in which the cloud server obtains the device attribute parameter of the user equipment and determines the faulty user equipment based on the device working status parameter included in the device attribute parameter is described in detail. Details are not described herein again.

Step 820: The control device displays the fault information.

Specifically, after receiving the fault information, the control device displays the fault information by using a touchscreen.

Step 830: The control device receives a selection operation that is entered by a user based on the fault information.

Specifically, when the user views the fault information displayed by the control device, the user may perform selection processing for the fault information based on a current situation.

In this embodiment of the present invention, the notification message further includes prompt information used to prompt the user how to process the faulty user equipment. The prompt information is used to provide the user with a recommended measure used to process the faulty user equipment, For example, the prompt information is specifically "maintain the faulty user equipment", or the prompt information is specifically "not maintain the faulty user equipment", or the prompt information is specifically "keep observing for later prompt". The user may choose whether to maintain the faulty user equipment based on a current situation. If the user expects to immediately maintain the faulty equipment, the user selects a prompt key of "maintain the faulty equipment", and the control device receives the selection operation entered by the user.

Step 840: The control device sends a first feedback message to the cloud server based on the selection operation, where the first feedback message is used to enable the cloud server to send the fault information and attribute information of the user to a maintenance server.

Specifically, after receiving the selection operation, the control device generates the first feedback message, and sends the first feedback message to the cloud server.

The cloud server sends the fault information and the attribute information of the user to the maintenance server based on the first feedback message.

Therefore, the value-added service implementation method provided in this embodiment of the present invention is applied. After determining the faulty user equipment from the at least one user equipment, the cloud server sends the fault information of the faulty user equipment to the control device corresponding to the faulty user equipment. The control device displays the fault information, and receives the selection operation that is entered by the user based on the fault information. The control device sends the first feedback message for the selection operation to the cloud server. The cloud server communicates with the maintenance server based on the first feedback message to notify the maintenance server of the fault information of the faulty user equipment and the attribute information of the user, so that the maintenance server contacts the user based on the attribute information of the user, and maintains the faulty user equipment based on the fault information. Therefore, a fault of a smart household appliance is predicted, fault information of a currently used smart household appliance is provided for a user, and if necessary, services such as maintenance and repair of the smart household appliance are provided for the user, thereby improving user experience.

Optionally, in this embodiment of the present invention, the method further includes a step of sending, by the control device, a second feedback message or a third feedback message to the cloud server based on the selection operation entered by the user. In this step, the cloud server may process the faulty user equipment based on a selection of the user.

Specifically, in an example, the user refuses to maintain the faulty user equipment, and the user selects a prompt key of "not maintain the faulty user equipment". The control device receives the selection operation entered by the user, generates a second feedback message based on the selection operation, and sends the second feedback message to the cloud server.

The cloud server receives the second feedback message, and determines, based on the second feedback message, that the user refuses to maintain the faulty user equipment. The cloud server determines again whether the faulty user equipment is still in a faulty state. If the faulty user equipment is still in the faulty state, the cloud server stops sending the fault information to the control device.

In another example, the user does not expect to immediately maintain the faulty user equipment, and the user selects a prompt key of "keep observing for later prompt". The control device receives the selection operation entered by the user, generates a third feedback message based on the selection operation, and sends the third feedback message to the cloud server.

The cloud server receives the third feedback message, and determines, based on the third feedback message, that the user does not expect to immediately maintain the faulty user equipment. When the cloud server subsequently determines that the faulty user equipment is in the faulty state again, the cloud server sends the fault information to the control device again.

Figure 9:
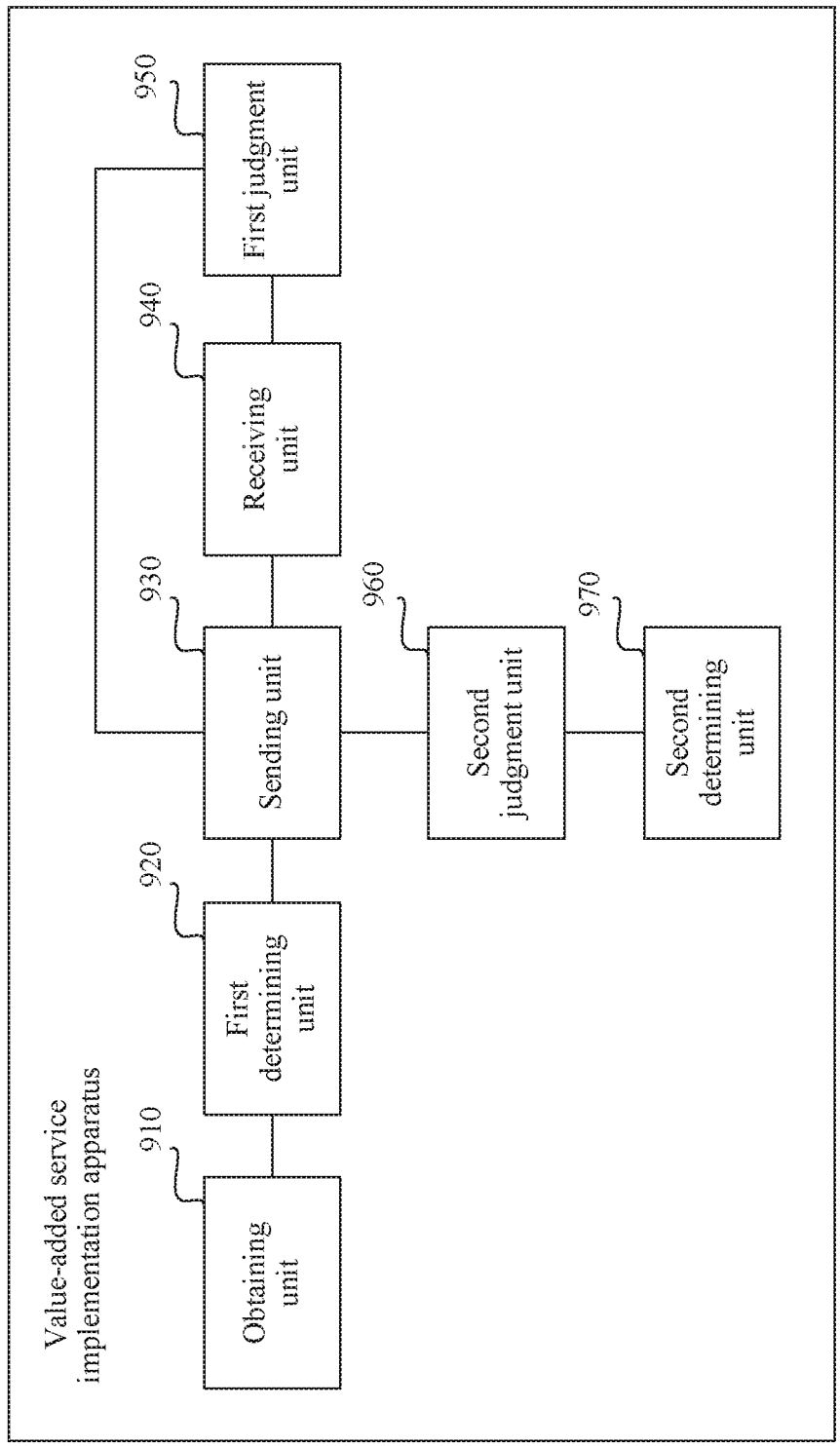
FIG. 9 is a schematic diagram of a value-added service implementation apparatus according to an embodiment of the present invention.

All the content described in the foregoing embodiments can implement the value-added service implementation method. Correspondingly, an embodiment of the present invention further provides a value-added service implementation apparatus, so as to implement the value-added service implementation method provided in the foregoing embodiments. As shown in FIG. 9, the apparatus includes an obtaining unit 910, a first determining unit 920, a sending unit 930, and a receiving unit 940.

The obtaining unit 910 is configured to obtain a device attribute parameter of at least one user equipment. The device attribute parameter includes a device working status parameter.

The first determining unit 920 is configured to determine faulty user equipment from the at least one user equipment based on the device working status parameter.

The sending unit 930 is configured to send a notification message to a control device corresponding to the faulty user equipment. The notification message includes fault information of the faulty user equipment, so that the control device displays the fault information, and receives a selection operation that is performed by a user based on the fault information.

The receiving unit 940 is configured to receive a first feedback message that is sent by the control device based on the selection operation.

The sending unit 930 is further configured to send the fault information and attribute information of the user to a maintenance server based on the first feedback message.

Further, the receiving unit 940 is further configured to receive a second feedback message that is sent by the faulty user equipment based on the selection operation.

The apparatus further includes a first judgment unit 950, configured to determine whether the control device is still in a faulty state.

The sending unit 930 is further configured to stop sending the fault information to the control device if the faulty user equipment is still in the faulty state.

Further, the receiving unit 940 is further configured to receive a third feedback message that is sent by the control device based on the selection operation.

The sending unit 930 is further configured to send the fault information to the control device again.

Further, the first determining unit 920 is specifically configured to: perform average-based statistical processing on the device working status parameter to obtain a user equipment reference average value;
    obtain a working status distribution curve diagram of the user equipment based on the device working status parameter;
    determine a device critical interval and at least one device interval based on the working status distribution curve diagram; and
    when the device critical interval is on a left side of the user equipment reference average value, determine the adjacent device interval on a left side of the device critical interval as a faulty device interval, and determine the adjacent device interval on a right side of the device critical interval as a normal device interval; or when the device critical interval is on a right side of the user equipment reference average value, determine the adjacent device interval on a left side of the device critical interval as a normal device interval, and determine the adjacent device interval on a right side of the device critical interval as a faulty device interval.

Further, the fault information included in the notification message sent by the sending unit 930 includes fault cause information and fault type information of the faulty user equipment.

The apparatus further includes: a second judgment unit 960, configured to determine whether the device working status parameter meets a preset fault condition; and
    a second determining unit 970, configured to determine a fault cause and a fault type of the faulty user equipment based on the fault condition if the device working status parameter meets the fault condition.

Further, the first determining unit 920 is specifically configured to: receive a setting instruction, where the setting instruction includes a second screening threshold;
    determine whether the device working status parameter meets the second screening threshold; and
    if the device working status parameter meets the second screening threshold, determine that the user equipment is normal user equipment; or if the device working status parameter does not meet the second screening threshold, determine that the user equipment is faulty user equipment.

Therefore, the value-added service implementation apparatus provided in this embodiment of the present invention is applied. The apparatus determines faulty user equipment based on obtained device attribute parameters of a plurality of user equipments, and sends fault information to a control device corresponding to the faulty user equipment, so that the control device displays the fault information, and receives a selection operation that is performed by a user based on the fault information. The apparatus communicates with the maintenance server based on a first feedback message sent by the control device to notify the maintenance server of the fault information of the faulty user equipment and attribute information of the user, so that the maintenance server contacts the user based on the attribute information of the user, and maintains the faulty user equipment based on the fault information. Therefore, a fault of a smart household appliance is predicted, fault information of a currently used smart household appliance is provided for a user, and if necessary, services such as maintenance and repair of the smart household appliance are provided for the user, thereby improving user experience.

Figure 10:
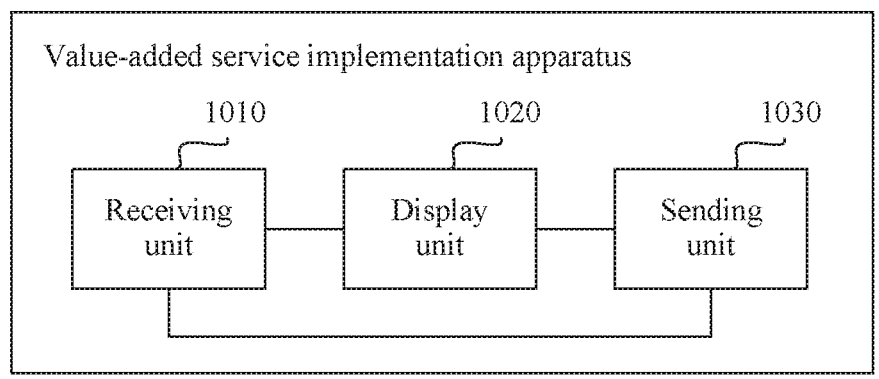
FIG. 10 is a schematic diagram of another value-added service implementation apparatus according to an embodiment of the present invention.

All the content described in the foregoing embodiments can implement the value-added service implementation method. Correspondingly, an embodiment of the present invention further provides another value-added service implementation apparatus, so as to implement the value-added service implementation method provided in the foregoing embodiments. As shown in FIG. 10, the apparatus includes a receiving unit 1010, a display unit 1020, and a sending unit 930.

The receiving unit 1010 is configured to receive a notification message sent by a cloud server. The notification message includes fault information of faulty user equipment determined by the cloud server from at least one user equipment.

The display unit 1020 is configured to display the fault information.

The receiving unit is further configured to receive a selection operation that is entered by a user based on the fault information.

The sending unit 1030 is configured to send a first feedback message to the cloud server based on the selection operation. The first feedback message is used to enable the cloud server to send the fault information and attribute information of the user to a maintenance server.

Further, the sending unit 1030 is further configured to send a second feedback message to the cloud server based on the selection operation. The second feedback message is used to enable the cloud server to determine whether the faulty user equipment is still in a faulty state, and if the faulty user equipment is still in the faulty state, the cloud server stops sending the fault information to the control device.

Further, the sending unit 1030 is further configured to send a third feedback message to the cloud server based on the selection operation. The third feedback message is used to enable the cloud server to send the fault information to the control device again.

Therefore, the control device provided in this embodiment of the present invention is applied. After determining the faulty user equipment from the at least one user equipment, the cloud server sends the fault information of the faulty user equipment to the control device corresponding to the faulty user equipment. The control device displays the fault information, and receives the selection operation that is entered by the user based on the fault information. The control device sends the first feedback message for the selection operation to the cloud server. The cloud server communicates with the maintenance server based on the first feedback message to notify the maintenance server of the fault information of the faulty user equipment and the attribute information of the user, so that the maintenance server contacts the user based on the attribute information of the user, and maintains the faulty user equipment based on the fault information. Therefore, a fault of a smart household appliance is predicted, fault information of a currently used smart household appliance is provided for a user, and if necessary, services such as maintenance and repair of the smart household appliance are provided for the user, thereby improving user experience.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The steps in the method or algorithm described in the embodiments disclosed in this specification may be implemented by hardware, software module executed by the processor, or combination of hardware and software. The software module may reside in a random-access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementations, the objective, technical solutions, and benefits of the present invention are further described in detail. It should be understood that the foregoing descriptions are merely specific implementations of the present invention, but are not intended to limit the protection scope of the present invention. Any modification, equivalent replacement, or improvement made without departing from the spirit and principle of the present invention should fall within the protection scope of the present invention.

What is claimed is:

1. A system comprising:
a plurality of smart household user equipment, wherein each of the plurality of user equipment is configured to report a working status parameter; and
a server configured to:
  receive working status parameters from the plurality of user equipment;
  determine, based on performing average-based statistical processing of the working status parameters of the plurality of user equipment, an average value of a plurality of working status parameters to obtain, for each user equipment, a user equipment reference average value and a user equipment variance value;
  determine a first user equipment of the plurality of user equipment as faulty based on the working status parameters, user equipment reference average value, and user equipment variance value of the first user equipment;
  send fault information to a control device corresponding to the first user equipment, wherein the fault information comprises a fault type; and receive, from the control device, a response indicating a request for maintenance of the first user equipment in response to a user's selection on the control device.

2. The system of claim 1, wherein the fault information further comprises a fault cause, and wherein the server is further configured to send user information of the first user equipment to a maintenance server according to the response from the control device.

3. The system of claim 1, wherein the fault information comprises information of the first user equipment for display on the control device.

4. The system of claim 1, wherein the server is further configured to:
obtain a working status distribution curve of the plurality of user equipment based on a distribution of the plurality of working status parameters; and
identify, based on the working status distribution curve, wherein an interval in which neither a user equipment average value nor a user equipment variance changes, a faulty device when a device working status distribution curve is outside of a normal range of values.

5. The system of claim 4, wherein a working status parameter of the first user equipment falls outside of a normal range of values.

6. The system of claim 1, wherein the server is further configured to receive a setting instruction comprising a threshold.

7. The system of claim 6, wherein a working status parameter of the first user equipment meets the threshold.

8. The system of claim 6, wherein the control device comprises a mobile terminal.

9. The system of claim 6, wherein the plurality of user equipment comprises a household appliance.

10. A method used in a system comprising a plurality of smart household user equipment and a server, the method comprising:
reporting, by each of the plurality of user equipment, a working status parameter to the server;
receiving, by the server, working status parameters of the plurality of user equipment;
determining, based on performing average-based statistical processing of the working status parameters of the plurality of user equipment, an average value of a plurality of working status parameters to obtain, for each user equipment, a user equipment reference average value and a user equipment variance value;
determining, by the server, a first user equipment of the plurality of user equipment as faulty based on the working status parameters, user equipment reference average value, and user equipment variance value of the first user equipment;
sending, by the server, fault information to a control device corresponding to the first user equipment, wherein the fault information comprises a fault type; and
receiving, by the server from the control device, a response indicating a request for maintenance of the first user equipment in response to a user's selection on the control device.

11. The method of claim 10, wherein the fault information further comprises a fault cause, and wherein the method further comprises sending user information of the first user equipment to a maintenance server according to the response from the control device.

12. The method of claim 10, further comprising:
obtaining, by the server, a working status distribution curve of the plurality of user equipment based on a distribution of the plurality of working status parameters; and
identifying, by the server, based on the working status distribution curve, wherein an interval in which neither a user equipment average value nor a user equipment variance changes, a faulty device when a device working status distribution curve is outside of a normal range of values.

13. The method of claim 12, wherein a working status parameter of the first user equipment falls outside of a normal range of values.

14. The method of claim 10, wherein the method further comprises receiving, by the server, a setting instruction comprising a threshold.

15. The method of claim 14, wherein a working status parameter of the first user equipment meets the threshold.

16. An apparatus comprising:
a processor; and
a memory coupled to the processor and storing one or more programs that, when executed by the processor, cause the apparatus to be configured to:
receive working status parameters from a plurality of smart household user equipment;
determine, based on performing average-based statistical processing of the working status parameters of the plurality of user equipment, an average value of a plurality of working status parameters to obtain, for each user equipment, a user equipment reference average value and a user equipment variance value;
determine a first user equipment of the plurality of user equipment as being faulty based on working status parameters, user equipment reference average value, and user equipment variance value of the first user equipment;
send fault information to a control device corresponding to the first user equipment, wherein the fault information comprises a fault type; and
receive a response from the control device indicating a request for maintenance of the first user equipment in response to a user's selection on the control device.

17. The apparatus of claim 16, wherein the one or more programs are further configured to cause the apparatus to be configured to send fault information comprising a fault cause and user information of the first user equipment to a maintenance server according to the response from the control device.

18. The apparatus of claim 16, wherein the one or more programs are further configured to cause the apparatus to be configured to:
obtain a working status distribution curve of the plurality of user equipment based on a distribution of the plurality of working status parameters; and
identify, based on the working status distribution curve, wherein an interval in which neither a user equipment average value nor a user equipment variance changes, a faulty device when a device working status distribution curve is outside of a normal range of values.

19. The apparatus of claim 18, wherein a working status parameter of the first user equipment falls outside of a normal range of values.

20. The apparatus of claim 16, wherein a working status parameter of the first user equipment meets a threshold comprised in a received setting instruction.

* * * * *